US009051989B2

(12) United States Patent
Schumann et al.

(10) Patent No.: US 9,051,989 B2
(45) Date of Patent: Jun. 9, 2015

(54) MAGNETORHEOLOGICAL FLUID-BASED MOUNT APPARATUS INCLUDING RATE DIP TRACK PASSAGE

(75) Inventors: Eric Louis Schumann, Tipp City, OH (US); David John Barta, Beavercreek, OH (US); Brent Wade Fourman, New Paris, OH (US); Stephen Lewis Setty, Urbana, OH (US)

(73) Assignee: BeijingWest Industries Co., Ltd., Beijing (CN)

( * ) Notice: Subject to any disclaimer, the term of this patent is extended or adjusted under 35 U.S.C. 154(b) by 45 days.

(21) Appl. No.: 14/232,547

(22) PCT Filed: Jul. 12, 2012

(86) PCT No.: PCT/CN2012/078558
§ 371 (c)(1),
(2), (4) Date: Apr. 9, 2014

(87) PCT Pub. No.: WO2013/007204
PCT Pub. Date: Jan. 17, 2013

(65) Prior Publication Data
US 2014/0216869 A1  Aug. 7, 2014

Related U.S. Application Data

(60) Provisional application No. 61/506,709, filed on Jul. 12, 2011.

(51) Int. Cl.
| *F16F 7/10* | (2006.01) |
|---|---|
| *F16F 9/53* | (2006.01) |
| F16F 13/30 | (2006.01) |
| *F16F 9/46* | (2006.01) |
| *F16F 9/512* | (2006.01) |

(52) U.S. Cl.
CPC .............. *F16F 9/537* (2013.01); *F16F 13/305* (2013.01); *F16F 9/466* (2013.01); *F16F 9/5126* (2013.01)

(58) Field of Classification Search
USPC ......... 267/140.14–140.15; 248/550, 562, 566
See application file for complete search history.

(56) References Cited

U.S. PATENT DOCUMENTS

| 5,176,368 A | * | 1/1993 | Shtarkman | ............... 267/140.14 |
|---|---|---|---|---|
| 5,492,312 A | * | 2/1996 | Carlson | .................... 267/140.14 |
| 6,044,939 A | | 4/2000 | Forster | |
| 6,972,500 B2 | * | 12/2005 | Kon et al. | ....................... 310/14 |

FOREIGN PATENT DOCUMENTS

| CN | 101657651 | 2/2010 |
|---|---|---|
| CN | 101936360 | 1/2011 |
| JP | 63210428 | 2/1983 |

OTHER PUBLICATIONS

International Search Report, Oct. 10, 2012, three pages.

* cited by examiner

*Primary Examiner* — Christopher Schwartz
(74) *Attorney, Agent, or Firm* — Dickinson Wright PLLC (57) ABSTRACT

A magnetorheological fluid-based hydraulic mount apparatus (20, 220) for supporting a vibration source on a base is disclosed. A main fluid passage (104, 304) extends between pumping chamber (64, 264) and receiving chamber (66, 266) for passing the fluid therebetween. Electromagnet coil (98, 298) variably generates a magnetic flux across the main fluid passage to variably change the damping stiffness of the mount. A rate dip track passage (120, 320) extends between the pumping chamber (64, 264) and receiving chamber (66, 266) for oscillating the magnetorheological fluid (68, 268) therethrough to decrease the dynamic stiffness of the mount apparatus (20, 220) at predetermined frequencies. A controller (108) applies a current through the electromagnet coils (98, 298) at the predetermined frequencies and frequencies relatively close to and above the redetermined frequencies for substantially preventing the magnetorheological fluid (68, 268) from flowing through the main fluid passage (104, 304) to force the magnetorheological fluid (68, 268) to flow substantially only through the rate dip track passage (120, 320) for preventing a sharp increase in the dynamic stiffness of the hydraulic mount apparatus (20, 220) from occurring at these frequencies.

20 Claims, 3 Drawing Sheets

MAGNETORHEOLOGICAL FLUID-BASED MOUNT APPARATUS INCLUDING RATE DIP TRACK PASSAGE

BACKGROUND OF THE INVENTION

1. Field of the Invention

A magnetorheological fluid-based hydraulic mount apparatus for supporting a vibration source on a base.

2. Description of the Prior Art

Conventional hydraulic mounts exist for supporting and providing vibration isolation of vibration sources. One well-known application of these mounts is for supporting components of automotive vehicles. These mounts typically operate to provide engine vibration isolation while also controlling the motion of the engine and connected powertrain components with respect to the vehicle frame or body structure. In many applications of engine and powertrain mounts, it is desirable to vary damping characteristics of the mount to provide selective isolation of vibrations at certain frequencies.

Magnetorheological fluid-based vibration damping mounts have been developed to isolate or dampen vibrations at multiple frequencies. Magnetorheological fluid, as known in the art, is responsive to a magnetic field to modify its shear properties. Specifically, it has the ability to reversibly change from a free-flowing, linear, viscous liquid to a semi-solid with controllable yield strength when exposed to a magnetic field. These magnetorheological fluid-based mounts use this characteristic of the fluid to control the spring and damper rates when required.

One such magnetorheological fluid based mount is disclosed in U.S. Pat. No. 6,622,995 to Baudendistel et al. The mount includes a housing that extends about and along a first axis and defines a housing chamber. A flexible body made of an elastic material is partially disposed in the housing chamber and is interconnected with the housing for deforming elastically in response to movement of the vibration source relative to the housing caused by an external excitation. The flexible body extends radially about and along the first axis. A diaphragm made of an elastic material is disposed in the housing chamber and is spaced axially from the flexible body.

A partition assembly is disposed in the housing chamber between the flexible body and the diaphragm for dividing the housing chamber into a pumping chamber between the flexible body and the partition assembly, and a receiving chamber between the partition assembly and the diaphragm. The volume of each of the chambers is changed by deformation of the flexible body and the diaphragm in response to the external excitation. A sensor is disposed on an automotive vehicle for measuring a vibration condition of the vehicle in response to the external excitation and producing a corresponding vibration frequency signal. A magnetorheological fluid is contained within the pumping and receiving chambers. The partition assembly defines a main fluid passage that extends axially between the pumping and receiving chambers to establish fluid communication between the pumping and receiving chambers for passing the fluid therebetween in response to deformation of the flexible body and the diaphragm.

The partition assembly includes a plurality of electromagnet coils disposed adjacent to the main fluid passage for variably generating a magnetic flux across the main fluid passage for modifying the shear resistance of the fluid passing through the main fluid passage to variably change the dynamic stiffness of the mount apparatus.

Due to the mass of the magnetorheological fluid in magnetorheological fluid-based damping mounts, it is known for the dynamic spring rate to be undesirably high at certain frequencies, like the idle frequency of automotive vehicles. It is desirable to reduce the dynamic spring rate at these frequencies to reduce the vibrations felt by operators.

It is also known in the art for non-magnetorheological fluid based hydraulic damping mount apparatuses to include a rate dip track passage defined by a partition assembly and extending between pumping and receiving chambers for oscillating fluid therethrough to create a "rate dip" effect, or decrease in the dynamic stiffness of the mount apparatus at predetermined vibration frequencies. One such mount is disclosed in U.S. Pat. No. 6,592,110 to Takashima et al. on Jul. 15, 2003. However, a known issue with such mounts is that a "rate rise" or sharp increase in dynamic stiffness of the mount occurs at vibration frequencies above the predetermined rate dip frequency because fluid flows through both the rate dip track passage and a primary fluid passage, causing an overlap of the frequencies that the two passages are effective at.

SUMMARY OF THE INVENTION

The subject invention provides for such a magnetorheological fluid-based hydraulic mount apparatus like that disclosed in U.S. Pat. No. 6,622,995 and further incorporating a rate dip track passage defined by the partition assembly that extends between the pumping and receiving chambers and is radially spaced from the main fluid passage and the at least one electromagnet coil to define an upper track opening at the pumping chamber and a lower track opening at the receiving chambers for oscillating the magnetorheological fluid therethrough in response to the deformation of the flexible body and diaphragm to decrease the dynamic stiffness of the mount apparatus at a predetermined frequency. The mount apparatus further includes a controller for applying a current through the electromagnet coils in response to the signal from the sensor at the predetermined frequency and frequencies relatively close to and above the predetermined frequency for increasing the shear resistance of the magnetorheological fluid passing through the main fluid passage for substantially preventing the magnetorheological fluid from flowing through the main fluid passage to force the magnetorheological fluid to flow substantially only through the rate dip track passage for further decreasing the dynamic stiffness of the mount apparatus at the predetermined frequency and for preventing a sharp increase in the dynamic stiffness of the hydraulic mount apparatus from occurring at frequencies relatively close to and above the predetermined frequency.

Thus several advantages of one or more aspects of the invention are that a rate dip effect is created at the predetermined frequency (e.g. at idle frequency of an automotive vehicle), with the unwanted rate rise effect known in the prior art effectively eliminated at frequencies relatively close to and above the predetermined frequency because the path through which the magnetorheological fluid flows is controlled by the magnetorheological damping components of the system. Specifically, a relatively large current is applied to the at least one electromagnet coil at these frequencies, thereby substantially sealing the main fluid passage and forcing the fluid to only flow through the rate dip track passage, to provide for a larger rate dip effect and prevent the rate rise from occurring. Additionally, the greater density of the magnetorheological fluid in the mount of the invention as compared to the non-magnetorheological fluid in the mounts of the prior art provides for a greater rate dip effect.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Referring to the Figures, wherein like numerals indicate corresponding parts throughout the several views, a hydraulic mount apparatus 20, 220 is generally shown for supporting a vibration source on a base. In the enabling embodiments, the hydraulic mount apparatus 20, 220 is used for supporting a component on the frame of an automotive vehicle. However, it should be appreciated that the mount apparatus 20, 220 could be used for supporting various other vibration sources on a base.

The hydraulic mount apparatus 20, 220 includes a housing 22, 222 that defines a housing chamber 44, 244 therein. The housing 22, 222 includes a generally bowl-shaped lower housing portion 24, 224 that extends about and along a first axis A from a closed lower housing portion lower end 26, 226 to an open lower housing portion upper end 28, 228. The lower housing portion 24, 224 defines a lower housing portion lip 30, 230 that extends radially outwardly from the lower housing portion upper end 28, 228. The housing 22, 222 further includes a generally cup-shaped upper housing portion 32, 232 that is disposed generally axially above the lower housing portion 24, 224 and extends about and along a second axis B parallel to the first axis A from an open upper housing portion lower end 34, 234 to a closed upper housing portion upper end 36, 236. The upper housing portion lower end 34, 234 defines an upper housing portion lip 38, 238 that extends radially inwardly from the upper housing portion lower end 34, 234 and is disposed below and cooperates with the lower housing portion lip 30, 230 to restrict axial movement of the upper housing portion 32, 232 and the lower housing portion 24, 224 away from one another. It should be appreciated that the lower and upper housing portions 24, 32, 224, 232 could each have other shapes (e.g. square or rectangular shaped cross sections). The upper housing portion upper end 36, 236 defines a mounting flange 40, 240 that extends radially outwardly from the upper housing portion upper end 36, 236 for attachment with the vibration source (i.e. the frame of the automotive vehicle in the enabling embodiments). The upper housing portion upper end 36, 236 further defines an upper housing portion bore 42, 242 along the second axis B. The upper housing portion 32, 232 and the lower housing portion 24, 224 define the housing chamber 44, 244 therein.

The hydraulic mount apparatus 20, 220 further includes a flexible body 46, 246 made of an elastic material that extends radially about and axially along the second axis B from a generally frusto-conical shaped flexible body lower portion 48, 248 disposed in the housing chamber 44, 244, through the upper housing bore 42, 242, to a flexible body upper portion 50, 250 outside of the housing chamber 44, 244. The flexible body 46, 246 deforms elastically relative to the housing 22, 222 in response to movement of the component relative to the housing 22, 222 due to an external excitation (e.g. piston vibrations, engine rocking, road vibrations, etc.). The flexible body 46, 246 defines a flexible body passage 54, 254 that extends therethrough along the second axis B. The flexible body upper portion 50, 250 defines a flexible body flange 56, 256 that extends radially outwardly from the second axis B for engaging the closed upper housing portion upper end 36, 236 when the flexible body 46, 246 deforms past a predetermined length. In other words, the flexible body flange 56, 256 prevents the flexible body lower portion 48, 248 from flexing past the point in which the flexible body flange 56, 256 engages the upper housing portion upper end 36, 236.

A generally circular-shaped diaphragm 58, 258 made of an elastic material and defining a diaphragm edge 60, 260 is sealingly disposed in the housing chamber 44, 244 below the flexible body 46, 246. A partition assembly 62, 262 is disposed in the housing chamber 44, 244 between the flexible body 46, 246 and diaphragm 58, 258 for dividing the housing chamber 44, 244 into a pumping chamber 64, 264 between the flexible body 46, 246 and the partition assembly 62, 262 and a receiving chamber 66, 266 between the partition assembly 62, 262 and the diaphragm 58, 258 with the volume of each of the chambers 64, 66, 264, 266 being changed by deformation of the flexible body 46, 246 and the diaphragm 58, 258 in response to the external excitation. The partition assembly 62, 262 extends radially about and axially along the first axis A. A magnetorheological fluid 68, 268 is contained within the pumping and receiving chambers 64, 66, 264, 266. Magnetorheological fluid 68, 268, as known in the art, is responsive to modify its shear properties. Specifically, it has the ability to reversibly change from a free-flowing, linear, viscous liquid to a semi-solid with controllable yield strength when exposed to a magnetic field.

A metal upper support member 70, 270 that has a shape in conformance with the flexible body passage 54, 254 is disposed in the flexible body passage 54, 254 in engagement with and bonded to the flexible body 46, 246 adjacent the flexible body upper portion 50, 250 for restricting radially inward movement of the flexible body 46, 246. The upper support member 70, 270 extends radially about and along the second axis B from an upper support member lower portion 72, 272 inside the housing chamber 44, 244, through the upper housing portion bore 42, 242, to an upper support member upper portion 76, 276 outside of the housing chamber 44, 244. The upper support member 70, 270 defines an upper support member passage 78, 278 that extends therethrough along the second axis B. It should be appreciated that the upper support member 70, 270 could be made of various other high-strength materials.

A threaded and generally cylindrical-shaped first mounting member 80, 280 is fixedly disposed in the upper support member, passage 78, 278 and extends along the second axis B away from the upper support member upper portion 76, 276 for threadedly engaging the vibration source (i.e. the component of the vehicle in the enabling embodiment). It should be appreciated that the first mounting member 80, 280 could be interconnected with the vibration source in other ways (e.g. bolts or welding).

A metal reinforcing member 82, 282 that has a generally L-shaped cross section is disposed in the housing chamber 44, 244 radially about the second axis B. The reinforcing member 82, 282 defines a reinforcing member vertical portion 84, 284 disposed radially between the upper housing portion 32, 232 and the flexible body lower portion 48, 248 for restricting movement of the flexible body lower portion 48, 248 radially outwardly. The reinforcing member 82, 282 further defines a reinforcing member horizontal portion 86, 286 axially below the flexible body 46, 246 for restricting movement of the flexible body lower portion 48, 248 axially toward the reinforcing member 82, 282. It should be appreciated that the reinforcing member 82, 282 could be made out of other high-strength materials.

The partition assembly 62, 262 further includes a generally cylindrical-shaped, metal lower support member 88, 288 that extends radially about and along the first axis A from a lower support member lower end 83, 283 to a lower support member upper end 85, 285. The lower support member 88, 288 defines a lower support member flange 90, 290 that extends radially away from the lower support member 88, 288 adjacent the lower support member upper end 85, 285. It should be appreciated that the lower support member 88, 288 could be made of other high-strength materials and could have other shapes (e.g. a generally square-shaped cross section).

The partition assembly 62, 262 further includes a metal, generally cylindrical-shaped electromagnet support ring 92, 292 disposed radially between the lower support member 88, 288 and the upper housing portion 32, 232 and axially between the reinforcing member 82, 282 and the lower housing portion lip 30, 230. The electromagnet support ring 92, 292 defines an electromagnet groove 94, 294 extending radially thereabout. A spool-shaped bobbin 96, 296 is disposed in the electromagnet groove 94, 294. At least one electromagnet coil 98, 298 is wrapped about the bobbin 96, 296 for selectively generating a magnetic flux. The electromagnet support ring 92, 292 further defines a sensor cavity 100, 300 spaced radially outwardly from the electromagnet groove 94, 294. Additionally, the partition assembly 62, 262 includes a flux ring 102, 302 comprised of a material having a high magnetic permeability for concentrating the magnetic flux from the at least one electromagnet coil 98, 298 disposed radially between the lower support member 88, 288 adjacent the lower support member lower end 83, 283 and the electromagnet support ring 92, 292, and axially between the lower support member flange 90, 290 and the lower housing portion lip 30, 230. The diaphragm edge 60, 260 is sealingly sandwiched axially between the electromagnet support ring 92, 292 and the lower housing portion lip 30, 230. It should be appreciated that any number of electromagnet grooves 94, 294 bobbins 96, 296 and electromagnet coils 98, 298 could be disposed at various locations on the electromagnet support ring 92, 292. Additionally, it should be appreciated that more than one flux ring 102, 302 could be used.

The partition assembly 62, 262 defines at least one main fluid passage 104, 304 that extends axially between the pumping chamber 64, 264 and the receiving chamber 66, 266 and radially between the flux ring 102, 302 and the electromagnet support ring 92, 292 for passing the magnetorheological fluid 68, 268 between the pumping and receiving chambers 64, 66, 264, 266 in response to the deformation of the flexible body 46, 246 and the diaphragm 58, 258 due to the external excitation. To variably dampen vibrations at relatively low frequencies, typically at and less than approximately 20 Hz, such as those caused by road vibrations, the at least on electromagnet coil 98, 298 selectively generates a magnetic flux across the flux ring 102, 302 and main fluid passage, 104, 304 to increase the shear resistance of the magnetorheological fluid 68, 268 in the main fluid passage 104, 304 thereby increasing the damping stiffness of the mount apparatus 20, 220. In other words, by means of the magnetorheological damping components, the hydraulic mount apparatus 20, 220 is adapted to isolate or dampen vibrations at a range of relatively low frequencies to optimize the ride, comfort and handling characteristics of the automobile.

The hydraulic mount apparatus 20, 220 further includes a power supply 106 for supplying power to the mount apparatus 20, 220, and a controller 108 for controlling the magnetic flux generated by the at least one electromagnet coil 98, 298. A plurality of electromagnet wires 110, 310 extend through the upper housing portion 32, 232 between the controller 108, the at least one electromagnet coil 98, 298 and the power supply 106 for electrically connecting the at least one electromagnet coil 98, 298, the controller 108 and the power supply 106.

A sensor 112, 312 is disposed in the sensor cavity 100, 300 and extends into the pumping chamber 64, 264 for measuring a pressure change in the chamber in response to the deformation of the flexible body 46, 246 in response to the external excitation for generating a signal corresponding to a vibratory frequency of the component. It should be appreciated that more than one sensor 112, 312 could be used, and the sensor(s) 112, 312 could be placed at various locations on the vibrations source, hydraulic mount apparatus 20, 220, or base for measuring various vibration conditions of the vibration source such as displacement, velocity, or acceleration to produce signals that correspond with the vibratory frequency of the vibration source. A plurality of sensor wires 111, 311 extend between the controller 108, the sensor(s) 112, and the power source 106 for electrically connecting the controller 108, the sensor(s) 112, and the power source 106.

The controller 108 defines an electromagnet active operating state for applying a variable positive current through the electromagnet coils 98, 298 for inducing a magnetic flux across the main fluid passage 104, 304 for increasing the viscosity of the magnetorheological fluid 68, 268 for increasing the shear resistance of the magnetorheological fluid 68, 268 passing through the main fluid passage 104, 304 to variably increase the damping stiffness of the mount apparatus 20, 220. Additionally, the controller 108 defines an electromagnet inactive operating state wherein no current is applied across the main fluid passage 104, 304 such that the magnetorheological fluid 68, 268 passes through the main fluid passage 104, 304 without its viscosity changed. The controller 108 activates the electromagnet active and inactive operating states in response to the signal from the at least one sensor 112, 312 when the measured vibratory frequency is at the aforementioned relatively low frequencies.

To decrease the dynamic stiffness of the mount apparatus 20, 220 at predetermined frequencies, the lower support member 88, 288 defines a rate dip track passage 120, 320 that extends therethrough along the first axis A to define an upper track opening 124, 324 at the pumping chamber 64, 264 and a lower track opening 126, 326 at the receiving chamber 66, 266 for oscillating the magnetorheological fluid 68, 268 therethrough in response to the deformations of the flexible body 46, 246 and the diaphragm 58, 258. The rate dip track passage 120, 320 is spaced radially inwardly from the main fluid passage 104, 304 and the electromagnet coils 98, 298 at a predetermined distance such that the viscosity of the magnetorheological fluid 68, 268 passing through the rate dip track passage 120, 320 remains largely unaffected by the electromagnet coils 98, 298. The oscillating magnetorheological fluid 68, 268 acts as a mass spring element in series with the existing mount components so that a "rate dip" effect, or lowering of the overall dynamic spring rate of the mount apparatus 20, 220 is created at the predetermined frequency. In the enabling embodiments, this rate dip effect is tuned to the idle frequency of the automotive vehicle through sizing of the length and diameter of the rate dip track passage 120, 320. However, it should be appreciated that the rate dip track passage 120, 320 could be sized to produce a rate dip at other frequencies. It should further be appreciated that the position and shape of the rate dip track passage 120, 320 could vary to tune the mount apparatus 20, 220 for use with different systems.

A known problem with non-magnetorheological fluid-based mounts of the prior art that include rate dip track passages 120, 320 is that a 'rate rise' (or sharp increase in dynamic stiffness of the mount apparatus 20, 220) occurs at vibration frequencies greater than and relatively close to the rate dip frequency as a result of hydraulic fluid passing through both a primary fluid passage and the rate dip track passage at the same time. To offset this unwanted effect in the present invention, the main fluid passage 104, 304 can be substantially sealed by increasing the viscosity of the magnetorheological fluid 68, 268 in the main fluid passage 104, 304 by passing a relatively large current (i.e. approximately 0.3 amperes in the enabling embodiments) through the electromagnet coils 98, 298. The controller 108 of the present invention defines a rate dip operating state for applying the relatively large current through the electromagnet coils 98, 298 for substantially preventing the magnetorheological fluid 68, 268 from flowing through the main fluid passage 104, 304 to force the magnetorheological fluid 68, 268 to flow through the rate dip track passage 120, 320 at these frequencies.

Figure 3:
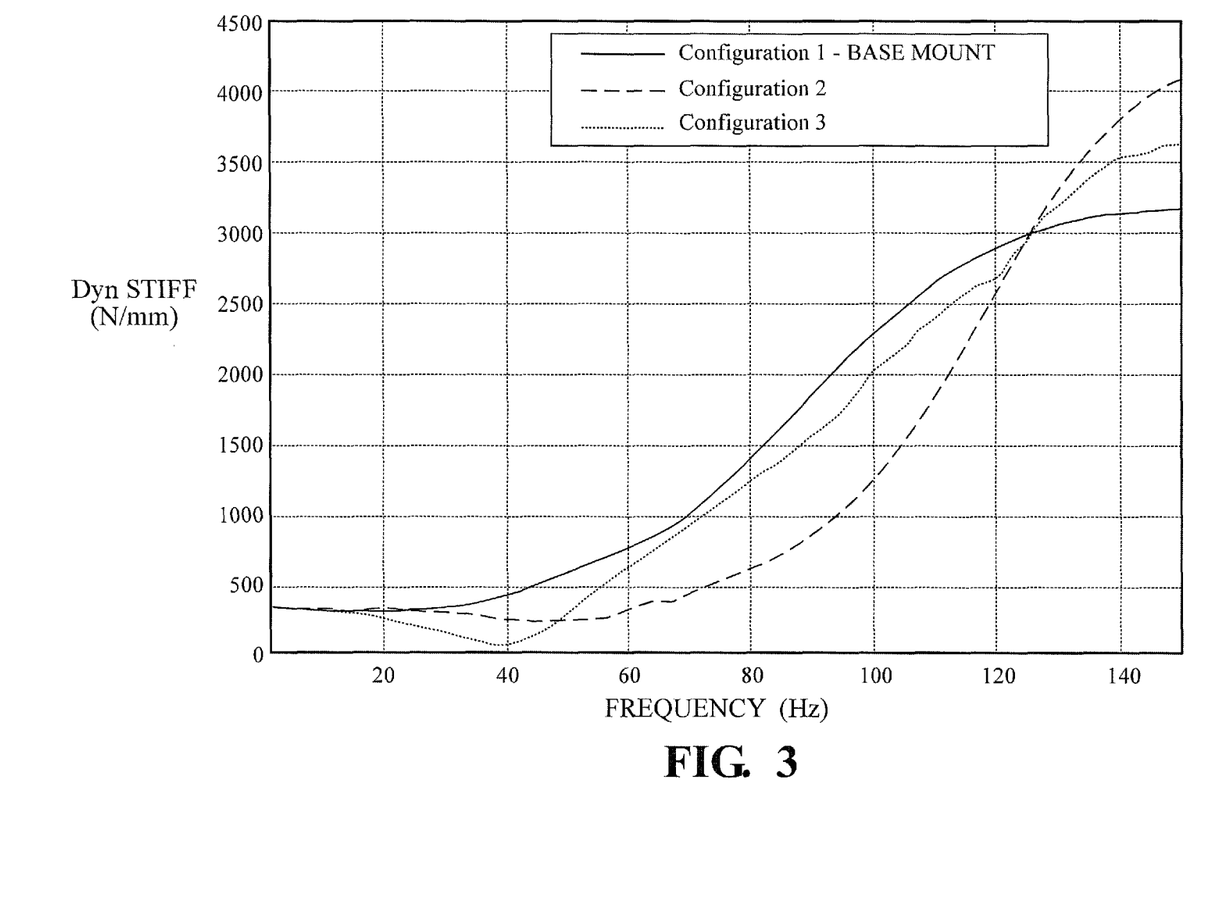
FIG. 3 is a graph of model testing data of dynamic stiffness vs. frequency for three different mount apparatus configurations.

FIG. 3 presents model testing data showing the advantages of including the rate dip track passage 120, 320 on the magnetorheological fluid-based mount apparatus 20, 220 of the present invention. Specifically, FIG. 3 presents dynamic stiffness vs. frequency for three different mount apparatus configurations. Configuration 1 is a hydraulic mount apparatus without a rate dip track passage and with no current applied through the electromagnet coils. Configuration 2 is a hydraulic mount apparatus with a rate dip track passage having a 15.9 mm diameter and no current applied through the electromagnet coils (similar to the rate dip track mounts of the prior art). Configuration 3 is a hydraulic mount apparatus with a rate dip track passage having a 15.9 mm diameter and a 0.3 ampere current applied through the electromagnet. It should be appreciated that the rate dip track could have various diameters and the magnitude of the current applied through the electromagnet coils could change based on the specific configuration of the mount apparatus and system it is being used on. As shown, model testing data shows that configurations 1 and 2 create a rate dip effect at about 40 Hz, approximately the idle frequency of an automotive vehicle, as a result of fluid oscillating through the rate dip track passage. Further, as also shown, the rate dip effect is of a greater magnitude in configuration 3 because the rate dip operating state is activated, effectively forcing all of the fluid through the rate dip track passage instead of the main fluid passage. Additionally, it is shown that the rate rise is substantially lower on configuration 3 than configuration 2 at frequencies relatively close to and above the rate dip frequencies because the rate dip operating state is activated.

To improve the effective range of conditions that the mount apparatus 20, 220 affects, the mount apparatus 20, 220 further includes a rate dip valve 128, 328 for selectively opening and closing the rate dip track passage 120, 320 by means of an actuator 130, 330, such that the rate dip track passage 120, 320 can be opened to enable the magnetorheological fluid 68, 268 to oscillate the magnetorheological fluid therethrough at various flow rates, or closed to maintain the functionality of the magnetorheological damping components without the rate dip track passage 120, 320. Selectively controlling the flow rate of the magnetorheological fluid 68, 268 through the rate dip track passage 120, 320 advantageously allows the frequency at which the rate dip occurs to be controlled. This ability is particularly advantageous in the automotive field because of the common practice of vehicle manufactures to vary the idle frequency of automotive vehicles based on engine operating temperature conditions or varying engine loads resulting from air conditioning or other electrical loads. Accordingly, because of the rate dip valve 128, 328 and actuator 130, 330, the rate dip can occur at various frequencies based on current engine operating conditions.

In the enabling embodiments, the rate dip valve 128, 328 generally has a mushroom shape and is disposed adjacent to the rate dip track passage 120, 320 and extends radially about the first axis A and axially from a lower shaft portion 132, 332 to an upper disc portion 134, 334. The upper disc portion 134, 334 of the rate dip valve 128, 328 defines a lower disc surface 136, 336 and an upper disc surface 138, 338. It should be appreciated that the rate dip valve 128, 328 could have other shapes so long as it is able to open and close the rate dip track passage 120, 320.

The actuator 130, 330 includes a generally cylindrical-shaped actuator case 140, 340 that extends radially about and axially along the first axis A from an actuator case lower end 142, 342 to an actuator case upper end 144, 344. It should be appreciated that various types of actuators having various shapes could be used (e.g. motor, solenoid, pressure differential device, etc.). An actuator moving member 146, 346 is partially disposed in and extends from the actuator case upper end 144, 344 for providing the axial movement of the rate dip valve 128, 328. A plurality of actuator wires 114, 314 extend between the actuator 130, 330, the controller 108 and the power supply 106 for electrically connecting the actuator 130, 330 and the controller 108 and the power supply 106.

Figure 1:
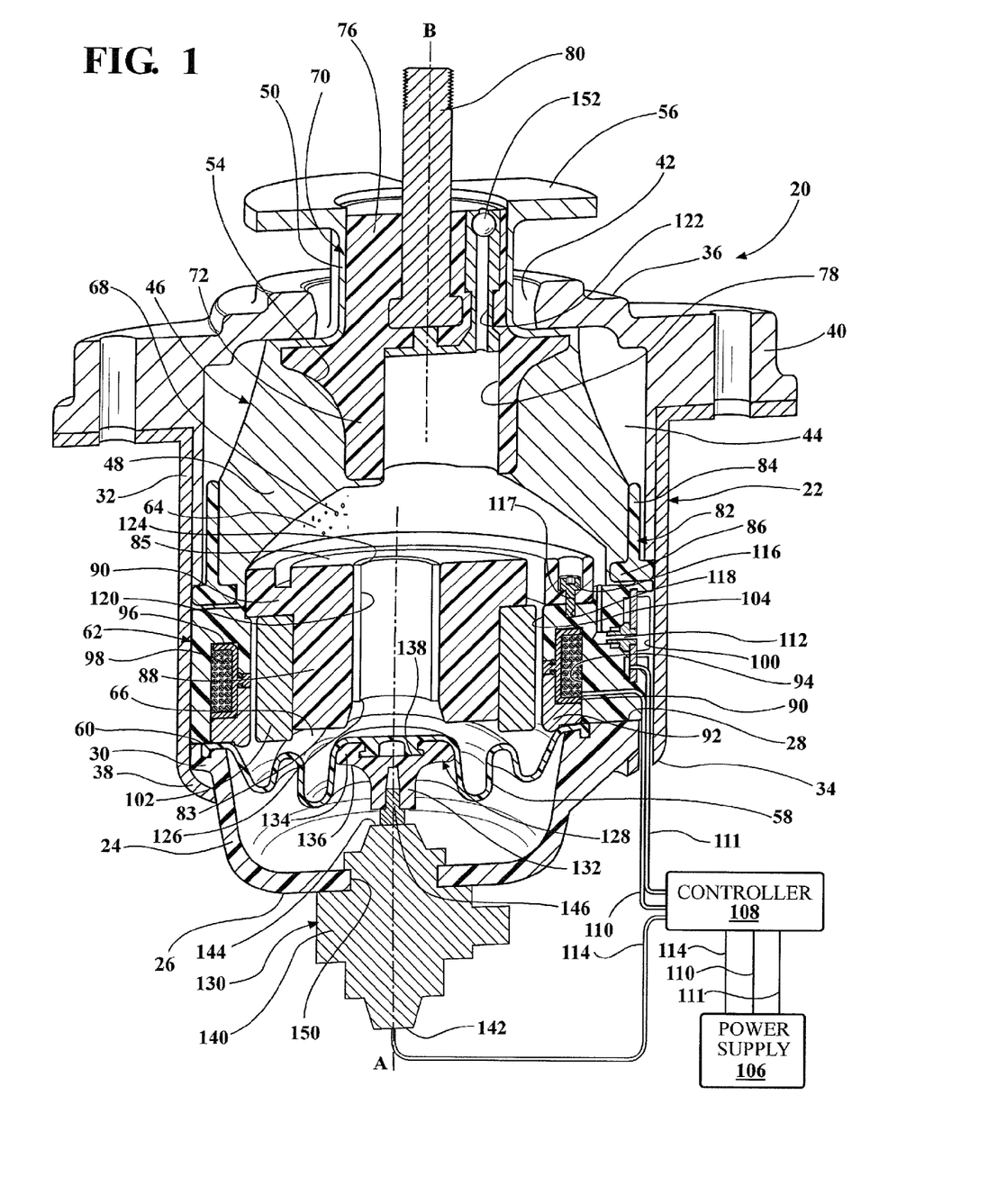
FIG. 1 is a cross-sectional view of the first enabling embodiment of the hydraulic mount apparatus and a schematic of the control system and power supply.

In the first enabling embodiment as best presented in FIG. 1, the rate dip valve 128 is axially sandwiched between the diaphragm 58 and the actuator moving member 146 such that the diaphragm 58 is selectively moved against the lower track opening 126 of the rate dip track passage 120 during the axial movement of the rate dip valve 128 to sealingly close the rate dip track passage 120. Further, the moving member 146 is a cylindrical-shaped piston that is slideably disposed in and extends from the actuator case 140 along the first axis A. Additionally, the lower housing portion lower end 26 defines a lower housing bore 150 along the first axis A. The actuator case 140 extends from the actuator case lower end 142 axially below the lower housing portion 24 through the lower housing bore 150 to the actuator case upper end 144 in the housing chamber 44. The upper support member 70 further defines a fill passage 122 that extends parallel to the second axis B therethrough into the pumping chamber 64 for receiving the magnetorheological fluid 68. A sealing ball 152 is disposed in the fill passage 122 for sealing the passage in response to the chambers 64, 66 being filled with the magnetorheological fluid 68.

Further, in the first enabling embodiment the lower support member 88 and electromagnet support ring 92 are interconnected with one another by means of a fastener 116. Specifically, the lower support member 88 defines at least one lower support member securing passage 117 that extends axially through the lower support member flange 90. Further, the electromagnet support ring 92 defines at least one electromagnet support ring securing passage 118 that extends axially into the electromagnet support ring 92 in alignment with the at least one lower support member securing passage 117. The fastener 116 threadedly extends through the securing passages 117, 118 of the lower support member 88 and the electromagnet support ring 92 for interconnecting the lower support member 88 and the electromagnet support ring 92. It should be appreciated that more securing passages 117, 118 and fasteners 116 could be present.

Figure 2:
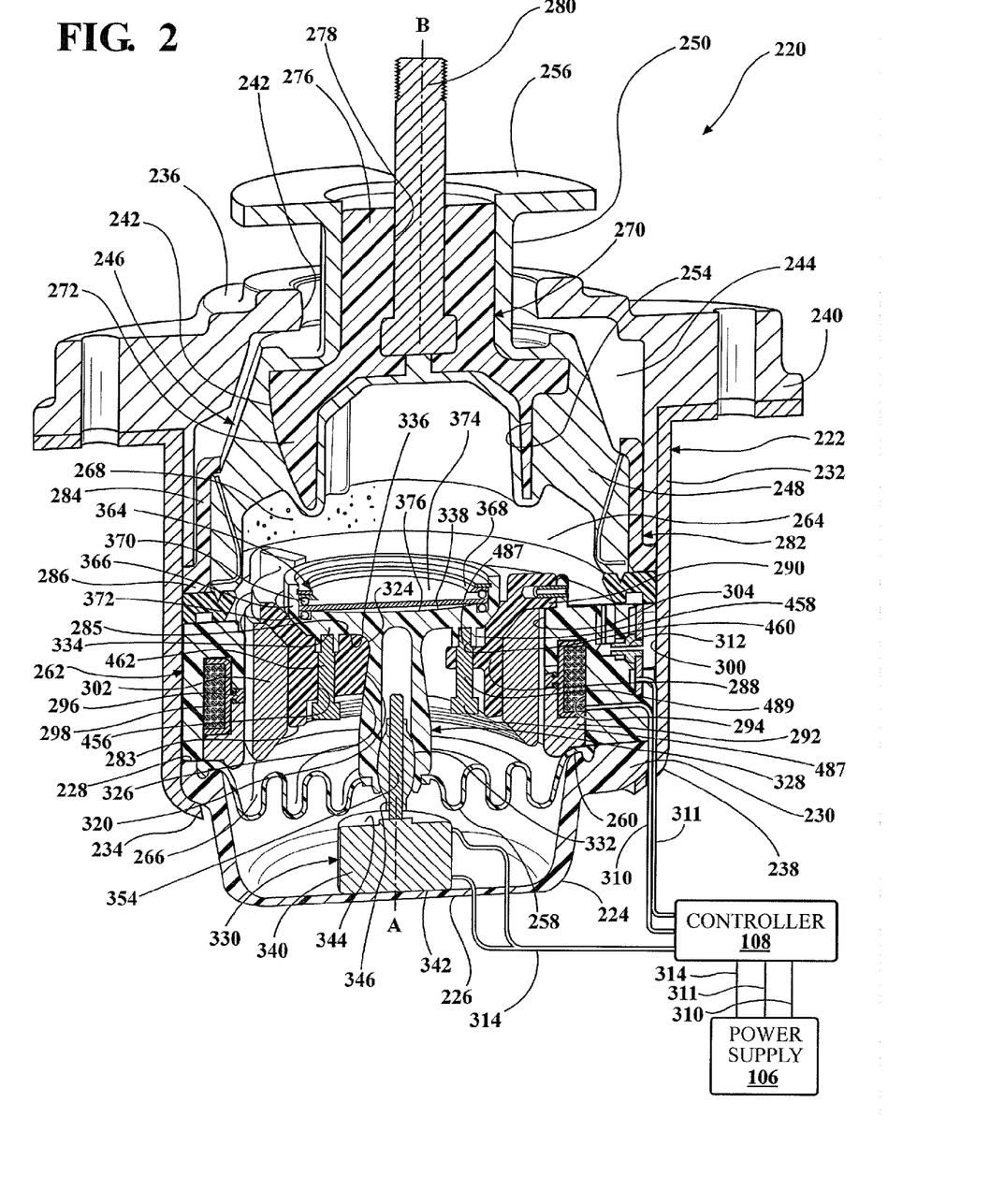
FIG. 2 is a cross-sectional view of the second enabling embodiment of the hydraulic mount apparatus and a schematic of the control system and power supply.

In the second enabling embodiment, the lower shaft portion 332 of the rate dip valve 328 extends from the receiving chamber 266, through the rate dip track passage 320, to the upper disc portion 334 in the pumping chamber 264 for selectively moving the upper disc portion 334 of the rate dip valve 328 against the upper track opening 324 of the rate dip track passage 320 during the axial movement of the rate dip valve 328 to sealingly close the rate dip track passage 320. In this embodiment, the pressure in the pumping chamber 264 advantageously biases the rate dip valve 328 against the upper track opening 324 of the rate dip track passage 320. Further, the lower shaft portion 332 of the rate dip valve 328 defines a threaded valve bore 354 that extends into the lower shaft portion 332 along the first axis A. The actuator moving member 346 is also threaded and is threadedly disposed in the valve bore 354 for rotational movement therein about the first axis A to provide for the axial movement of the rate dip valve 328. In other words, the actuator 330 of the second enabling embodiment is a "screw type" actuator by which the threaded moving member 346 spins to axially move the rate dip valve 328. The lower support member 288 defines at least a pair of shoulder bolt bores 456 that extend axially therethrough and are radially spaced from the first axis A. A pair of cylindrical-shaped receiving bolt rings 458 each extend axially away from the lower disc surface 336 in alignment with one of the shoulder bolt bores 456. Each of the receiving bolt rings 458 define a receiving bolt ring inner surface 460 having threads. A shoulder bolt 462 extends from a bolt head 487 in the receiving chamber 266 to a threaded bolt shaft 489 that extends axially through one of each of the shoulder bolt bores 456 and into and in threaded engagement with one of each of the receiving bolt rings 458 for preventing the rate dip valve 328 from rotating during the rotational movement of the actuator moving member 346 to allow the axial movement of the rate dip valve 328 and for preventing the rate dip valve 328 from axially moving further than a predetermined distance because the bolt head 487 engages the lower support member 288 upon axial movement of the rate dip valve 328 past the predetermined distance.

To further reduce the dynamic stiffness of the hydraulic mount apparatus 220, the hydraulic mount apparatus 220 of the second enabling embodiment further includes a decoupler assembly 364 to maintain the volume of fluid in the pumping chamber 264. The decoupler assembly 364 includes a decoupler ring 366 that extends axially away from the upper surface 338 of the upper disc portion 334 of the rate dip valve 328 into the pumping chamber 264. A decoupler flange 368 extends radially inwardly from the decoupler ring 366. An upper O-ring 370 is disposed axially below and in engagement with the decoupler flange 368. A lower O-ring 372 is disposed axially below the upper O-ring 370 in engagement with the upper disc surface 338 of the rate dip valve 328. A disc-shaped decoupler membrane 374 made of a flexible material is disposed between and sealingly engages the upper and lower O-rings 370, 372 for axial movement against the O-rings 370, 372 in response to a change of pressure in the pumping chamber 264 to decrease the dynamic stiffness of the mount apparatus 220 by substantially maintaining the volume in the pumping chamber 264 to effectively cancel the idle frequency vibrations. Further, the upper disc portion 334 of the rate dip valve 328 is axially spaced from the decoupler membrane 374 to define a gas pocket 376 for tuning the dynamic stiffness of the mount apparatus 220 by varying the volume of gas in the gas pocket 376.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A magnetorheological fluid-based hydraulic mount apparatus for supporting a vibration source on a base comprising;

a housing extending about and along a first axis and defining a housing chamber, a flexible body made of an elastic material at least partially disposed in said housing chamber and interconnected with said housing and extending radially about and along said first axis for deforming elastically in response to movement of the vibration source relative to the housing caused by an external excitation, a diaphragm made of an elastic material disposed in said housing chamber and spaced axially from said flexible body, a partition assembly disposed in said housing chamber between said flexible body and said diaphragm for dividing said housing chamber into a pumping chamber between said flexible body and said partition assembly and a receiving chamber between said partition assembly and said diaphragm with the volume of each of said chambers being changed by deformation of said flexible body and said diaphragm in response to the external excitation, at least one sensor disposed on at least one of the hydraulic mount apparatus and the vibration source and the base for measuring a vibration condition of the vibration source in response to the external excitation and producing a corresponding vibration frequency signal, a magnetorheological fluid being responsive to a magnetic field to modify its shear properties contained within said pumping and receiving chambers, said partition assembly defining a main fluid passage extending axially between said pumping chamber and said receiving chamber to establish fluid communication between said pumping receiving chambers for passing said fluid therethrough in response to said deformation of said flexible body and said diaphragm, said partition assembly including at least one electromagnet coil disposed adjacent to said main fluid passage for variably generating a magnetic flux across said main fluid passage for modifying the shear resistance of said magnetorheological fluid passing therethrough to variably change the dynamic stiffness of said mount apparatus, said partition assembly further defining a rate dip track passage extending between said pumping and receiving chambers and radially spaced from said main fluid passage and said at least one electromagnet coil to define an upper track opening at said pumping chamber and a lower track opening at said receiving chambers for oscillating said magnetorheological fluid therethrough in response to said deformation of said flexible body and said diaphragm to decrease the dynamic stiffness of the mount apparatus at a predetermined frequency, a controller for applying a current through said electromagnet coils in response to said signal from said sensor at said predetermined frequency and frequencies relatively close to and above said predetermine frequency for increasing the shear resistance of said magnetorheological fluid passing through said main fluid passage for substantially preventing said magnetorheological fluid from flowing through said main fluid passage to force said magnetorheological fluid to flow substantially only through said rate dip track passage for further decreasing the dynamic stiffness of the mount apparatus at said predetermined frequency and preventing a sharp increase in the dynamic stiffness of said hydraulic mount apparatus from occurring at frequencies above said predetermined frequency.

2. A magnetorheological fluid-based hydraulic mount apparatus as set forth in claim 1 including said rate dip track passage extending along said first axis and spaced radially inwardly from said main fluid passage and said at least one electromagnet coil.

3. A magnetorheological fluid-based hydraulic mount apparatus as set forth in claim 1 including a rate dip valve disposed adjacent to said rate dip track passage for axial movement toward and away from said rate dip track passage for selectively opening and closing said rate dip track passage.

4. A magnetorheological fluid-based hydraulic mount apparatus as set forth in claim 3 including said rate dip valve generally having mushroom shape and extending radially about said first axis and axially along said first axis from a lower shaft portion generally having a cylindrical shape to an upper disc portion generally having a disc shape.

5. A magnetorheological fluid-based hydraulic mount apparatus as set forth in claim 4 including an actuator including an actuator case extending from an actuator case lower end to an actuator case upper end and an actuator moving member partially disposed in and extending from said actuator case upper end for providing said axial movement of said rate dip valve.

6. A magnetorheological fluid-based hydraulic mount apparatus as set forth in claim 5 including said rate dip valve being axially sandwiched between said diaphragm and said actuator moving member for selectively moving said diaphragm against said lower track opening of said rate dip track passage during said axial movement of said rate dip valve to sealingly close said rate dip track passage.

7. A magnetorheological fluid-based hydraulic mount apparatus as set forth in claim 6 including said moving member being a piston slideably disposed in and extending from said actuator case along said first axis.

8. A magnetorheological fluid-based hydraulic mount apparatus as set forth in claim 5 including said lower shaft portion of said rate dip valve extending from said receiving chamber through said rate dip track passage to said upper disc portion in said pumping chamber for selectively moving said upper disc portion of said rate dip valve against said upper track opening of said rate dip track passage during said axial movement of said valve to sealingly close said rate dip track passage.

9. A magnetorheological fluid-based hydraulic mount apparatus as set forth in claim 8 including said lower shaft portion of said rate dip valve defining a valve bore having threads extending into said lower shaft portion along said first axis.

10. A magnetorheological fluid-based hydraulic mount apparatus as set forth in claim 9 including said actuator moving member having threads and being threadedly disposed in said valve bore for rotational movement therein about said first axis to provide for said axial movement of said rate dip valve.

11. A magnetorheological fluid-based hydraulic mount apparatus as set forth in claim 10 including said partition assembly defining at least a pair of shoulder bolt bores extending axially therethough and radially spaced from said first axis.

12. A magnetorheological fluid-based hydraulic mount apparatus as set forth in claim 11 including said upper disc portion of said rate dip valve defining a lower disc surface and an upper disc surface and a pair of receiving bolt rings having a cylindrical shape each extending axially away from said lower disc surface in alignment with one of each of said shoulder bolt bores and defining a receiving bolt ring inner surface having threads.

13. A magnetorheological fluid-based hydraulic mount apparatus as set forth in claim 12 including a shoulder bolt extending from a bolt head in said receiving chamber to a bolt shaft having threads extending axially through one of each of said shoulder bolt bores and into and in threaded engagement with one of each of said receiving bolt rings for preventing said rate dip valve from rotating during said rotational movement of said actuator moving member to allow said axial movement of said rate dip valve and for engagement of said bolt head against said partition assembly upon axial movement of said rate dip valve past a predetermined distance to prevent said rate dip valve from moving further than said predetermined distance.

14. A magnetorheological fluid-based hydraulic mount apparatus as set forth in claim 13 including a decoupler assembly for further reducing the dynamic stiffness of said mount apparatus.

15. A magnetorheological fluid-based hydraulic mount apparatus as set forth in claim 14 wherein said decoupler assembly includes a decoupler ring extending axially away from said upper disc portion of said valve into said pumping chamber.

16. A magnetorheological fluid-based hydraulic mount apparatus as set forth in claim 15 including a decoupler flange extending radially inwardly from said decoupler ring.

17. A magnetorheological fluid-based hydraulic mount apparatus as set forth in claim 16 including an upper O-ring disposed axially below and in engagement with said decoupler flange and a lower O-ring disposed axially below said upper O-ring in and in engagement with said upper disc surface of said rate dip valve.

18. A magnetorheological fluid-based hydraulic mount apparatus as set forth in claim 17 including a decoupler membrane disposed between and sealingly engaging said upper and lower O-rings for axial movement against said O-rings in response to a change of pressure in said pumping chamber to decrease the dynamic stiffness of said mount apparatus by substantially maintaining the volume in said pumping chamber to effectively cancel vibrations caused by said external excitation.

19. A magnetorheological fluid-based hydraulic mount apparatus as set forth in claim 18 including said upper disc portion of said rate dip valve being axially spaced from said decoupler membrane to define a gas pocket for tuning the dynamic stiffness of said mount apparatus by varying the volume of gas in said gas pocket.

20. A magnetorheological fluid-based hydraulic mount apparatus as set forth in claim 1 including the vibration source being a component of an automotive vehicle and the base being the frame of the automotive vehicle and said predetermined frequency being the idle frequency of the automotive vehicle and said controller defining a rate dip operating state for applying a relatively large current through said electromagnet coils for substantially preventing said magnetorheological fluid from flowing through said main fluid passage to force said fluid to flow through said rate dip track passage for preventing a sharp increase in dynamic stiffness of said hydraulic mount apparatus from occurring at frequencies above idle frequency of the automotive vehicle.

\* \* \* \* \*